US009265676B2

(12) United States Patent
Williams

(10) Patent No.: US 9,265,676 B2
(45) Date of Patent: Feb. 23, 2016

(54) DEVICE FOR CARRYING ARTICLES ON A PERSONAL MOBILITY VEHICLE

(71) Applicant: Rebecca Wright Williams, Chesapeake, VA (US)

(72) Inventor: Rebecca Wright Williams, Chesapeake, VA (US)

( * ) Notice: Subject to any disclaimer, the term of this patent is extended or adjusted under 35 U.S.C. 154(b) by 252 days.

(21) Appl. No.: 13/948,820

(22) Filed: Jul. 23, 2013

(65) Prior Publication Data

US 2015/0028073 A1    Jan. 29, 2015

(51) Int. Cl.
*B60R 7/00* (2006.01)
*B62J 7/00* (2006.01)
*A61G 5/10* (2006.01)

(52) U.S. Cl.
CPC .......... *A61G 5/10* (2013.01); *A61G 2005/1094* (2013.01); *Y10T 29/49826* (2015.01)

(58) Field of Classification Search
CPC ....................................................... A61G 5/10
USPC ................................................ 224/407–413
See application file for complete search history.

(56) References Cited

U.S. PATENT DOCUMENTS

| 4,902,029 | A | | 2/1990 | Gain et al. | |
|---|---|---|---|---|---|
| 4,915,276 | A | * | 4/1990 | Devito | 224/521 |
| 5,769,440 | A | * | 6/1998 | Jones | 280/204 |
| 6,547,112 | B2 | * | 4/2003 | Gallagher et al. | 224/407 |
| 7,188,855 | B1 | * | 3/2007 | Thomas | 280/304.1 |
| 7,334,712 | B2 | | 2/2008 | Hassett et al. | |
| 7,422,188 | B1 | * | 9/2008 | Schlosser | 248/535 |
| 7,967,174 | B2 | * | 6/2011 | Lauber | 224/407 |
| 8,608,038 | B2 | * | 12/2013 | Katchen et al. | 224/407 |
| 2006/0220346 | A1 | | 10/2006 | Fulton et al. | |
| 2006/0248775 | A1 | * | 11/2006 | Wade et al. | 42/94 |
| 2008/0296329 | A1 | * | 12/2008 | Guckes | 224/412 |
| 2009/0020575 | A1 | * | 1/2009 | Katchen et al. | 224/407 |
| 2012/0187265 | A1 | | 7/2012 | Bakerman | |
| 2013/0140779 | A1 | * | 6/2013 | Paul et al. | 280/47.4 |
| 2013/0264367 | A1 | * | 10/2013 | Hill | 224/413 |
| 2013/0320057 | A1 | * | 12/2013 | James | 224/413 |

* cited by examiner

*Primary Examiner* — Brian D Nash
*Assistant Examiner* — Derek Battisti
(74) *Attorney, Agent, or Firm* — Hunton & Williams LLP

(57) ABSTRACT

This invention relates to a multi-purpose article carrier for a personal mobility vehicle, such as a motorized mobility scooter or other powered mobility vehicle, of the type used to transport a disabled person. The present invention provides a light weight, easily installed and removable means whereby the user can easily and temporarily expand the carrying capacity of the personal mobility vehicle. The present invention does not appreciably add to the wind resistance, does not damage the vehicle, and is easy to drive and maneuver, since no portion of the device touches the ground while the vehicle is moving, and is easy to store when not in use.

13 Claims, 11 Drawing Sheets

ARTICAL CARRIER
AS MOUNTED ON MOBILITY SCOOTER

ISOMETRIC VIEW

ARTICAL CARRIER
AS MOUNTED ON MOBILITY SCOOTER

ISOMETRIC VIEW

ARTICAL CARRIER
AS MOUNTED ON MOBILITY SCOOTER
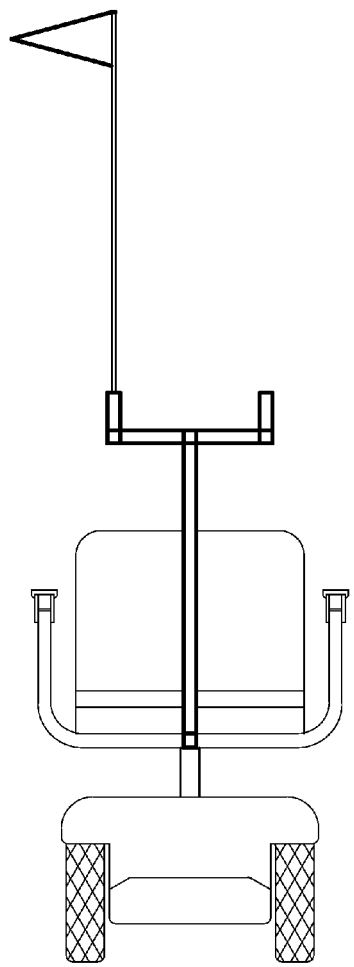
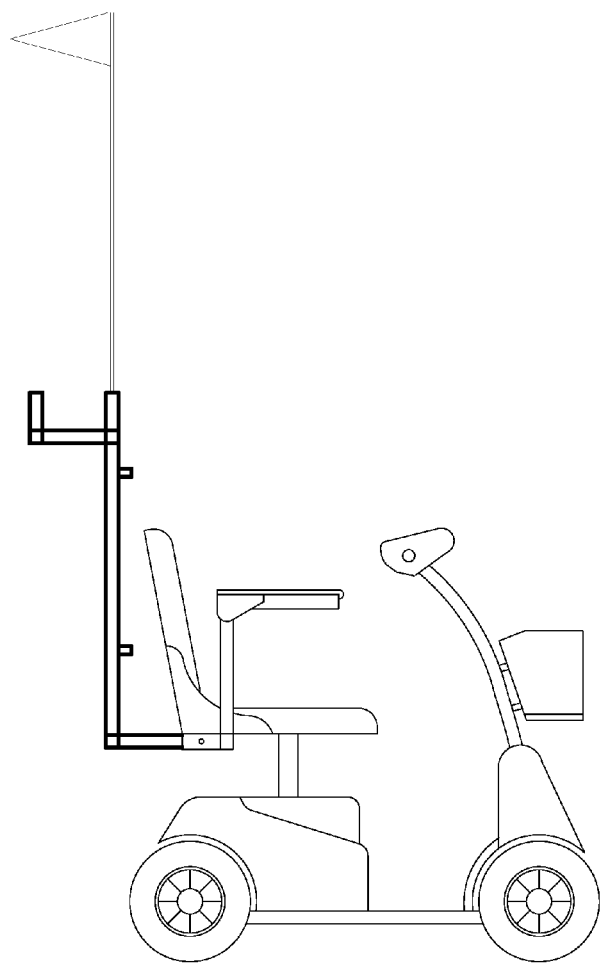
REAR ELEVATION
FIG. 2
SIDE ELEVATION
FIG. 3

ARTICAL CARRIER FRAME
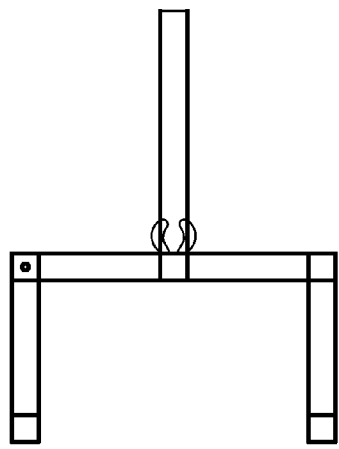
PLAN VIEW
FIG. 4A
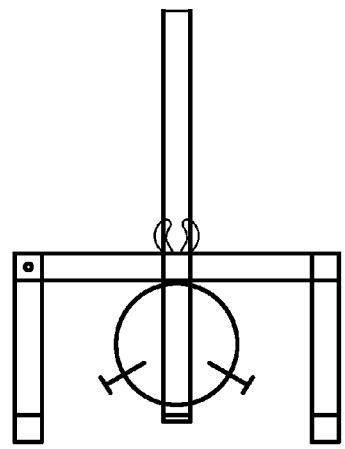
PLAN VIEW
FIG. 4B
FIG. 4

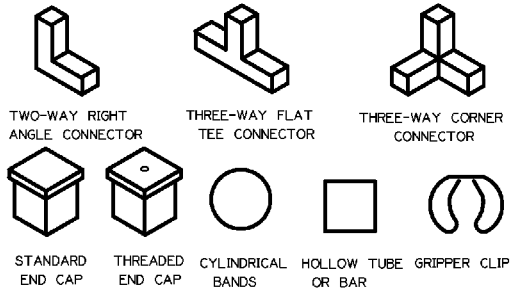

ARTICLE CARRIER FRAME
WITH OXYGEN TANK HOLDER ASSEMBLY

PARTS LIST

| | |
|---|---|
| 1 | MOUNTING BAR |
| 2 | THREE-WAY FLAT TEE CONNECTOR |
| 3 | TANK SUPPORT BAR |
| 4 | STANDARD END CAP |
| 5 | VERTICAL STRENGTH MEMBER |
| 6 | THREE-WAY FLAT TEE CONNECTOR |
| 7 | CROSS-MEMBER |
| 8 | THREE-WAY CORNER CONNECTOR |
| 9 | HORIZONTAL ARM |
| 10 | TWO-WAY RIGHT ANGLE CONNECTOR |
| 11 | REAR POST |
| 12 | STANDARD END CAP |
| 13 | FRONT POST |
| 14 | THREADED END CAP |
| 15 | CROSS-MEMBER |
| 16 | THREE-WAY CORNER CONNECTOR |
| 17 | HORIZONTAL ARM |
| 18 | TWO-WAY RIGHT ANGLE CONNECTOR |
| 19 | REAR POST |
| 20 | STANDARD END CAP |
| 21 | FRONT POST |
| 22 | STANDARD END CAP |
| 23 | CYLINDRICAL BAND W/ THUMBSCREWS |
| 24 | CYLINDRICAL BAND W/ THUMBSCREWS |
| 25 | GRIPPER CLIP |
| 26 | GRIPPER CLIP |
| 27 | THREADED ROD BASE |
| 28 | ROD |
| 29 | SAFETY FLAG |
| 38 | DRILLED HOLE |
| 39 | FASTENERS |

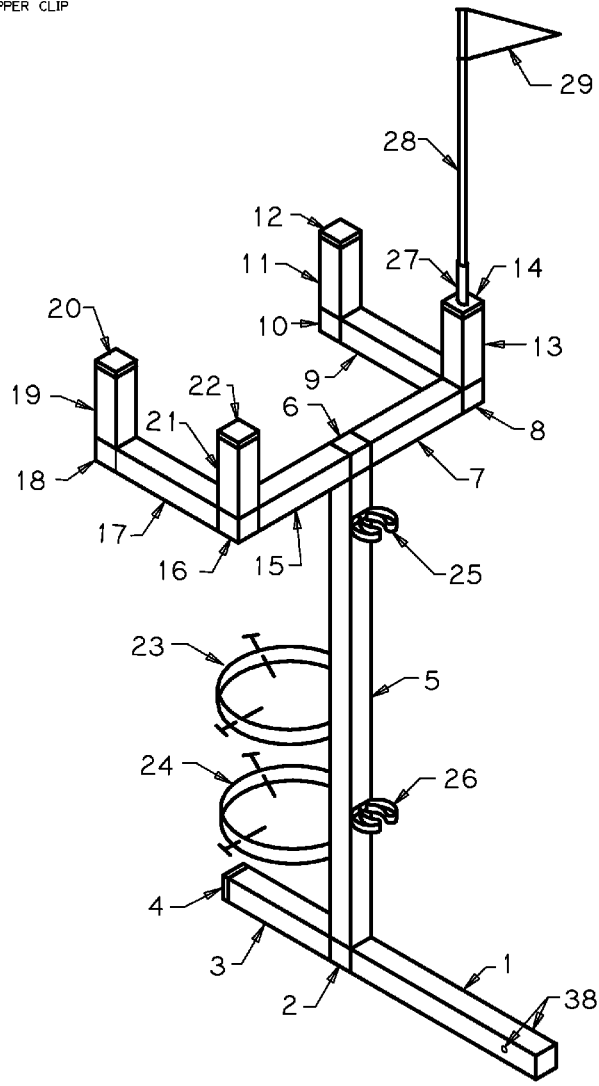

FIRST EMBODIMENT

ISOMETRIC VIEW
WITH OXYGEN TANK HOLDER ASSEMBLY
FIG. 5

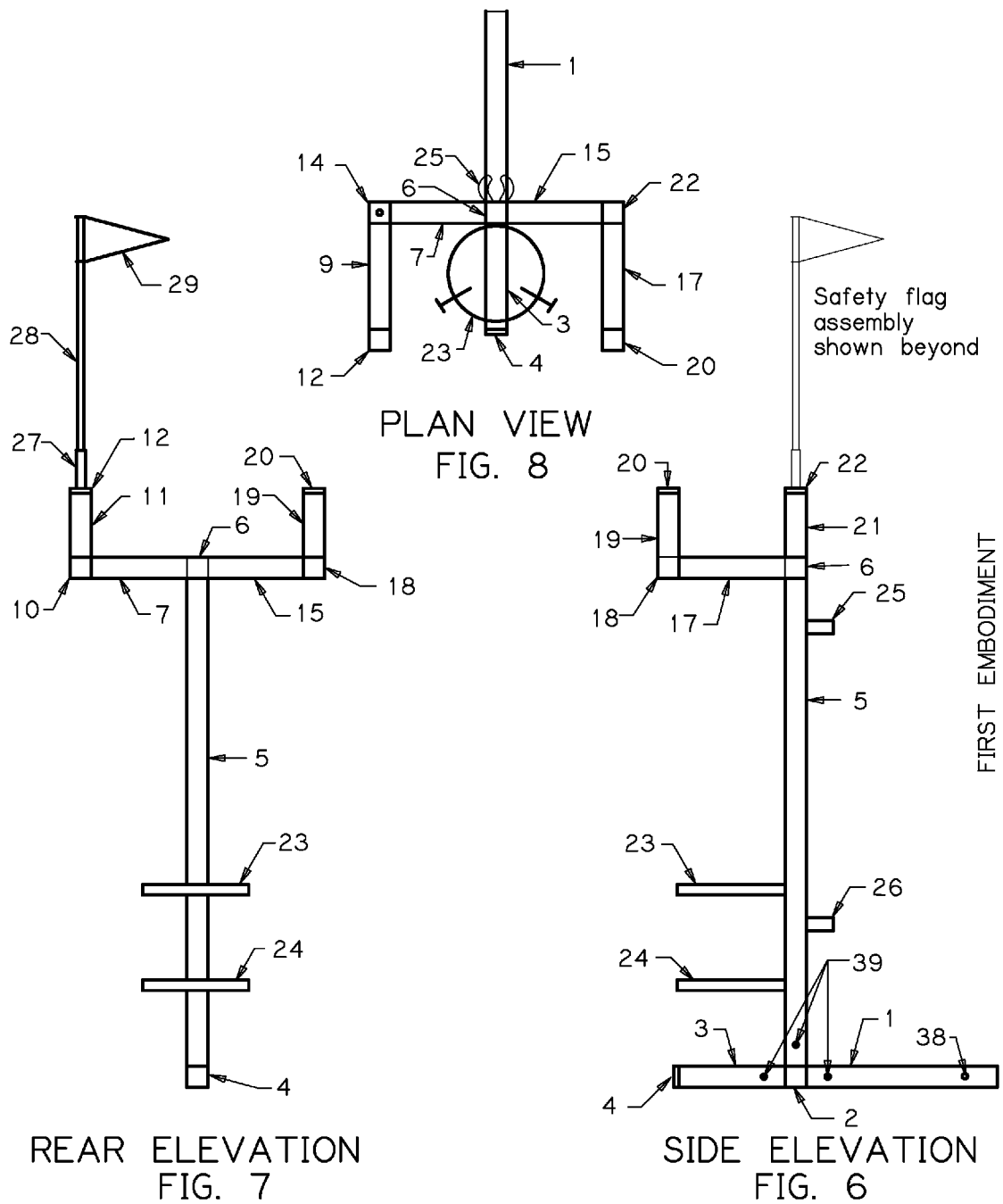

ARTICLE CARRIER FRAME

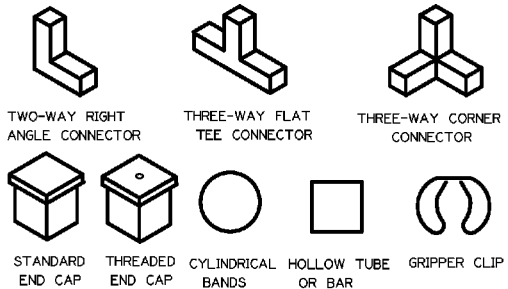

PARTS LIST

| # | Part |
|---|---|
| 1 | MOUNTING BAR |
| 5 | VERTICAL STRENGTH MEMBER |
| 6 | THREE-WAY FLAT TEE CONNECTOR |
| 7 | CROSS-MEMBER |
| 8 | THREE-WAY CORNER CONNECTOR |
| 9 | HORIZONTAL ARM |
| 10 | TWO-WAY RIGHT ANGLE CONNECTOR |
| 11 | REAR POST |
| 12 | STANDARD END CAP |
| 13 | FRONT POST |
| 14 | THREADED END CAP |
| 15 | CROSS-MEMBER |
| 16 | THREE-WAY CORNER CONNECTOR |
| 17 | HORIZONTAL ARM |
| 18 | TWO-WAY RIGHT ANGLE CONNECTOR |
| 19 | REAR POST |
| 20 | STANDARD END CAP |
| 21 | FRONT POST |
| 22 | STANDARD END CAP |
| 25 | GRIPPER CLIP |
| 26 | GRIPPER CLIP |
| 27 | THREADED ROD BASE |
| 28 | ROD |
| 29 | SAFETY FLAG |
| 30 | TWO-WAY RIGHT ANGLE CONNECTOR |
| 39 | FASTENERS |

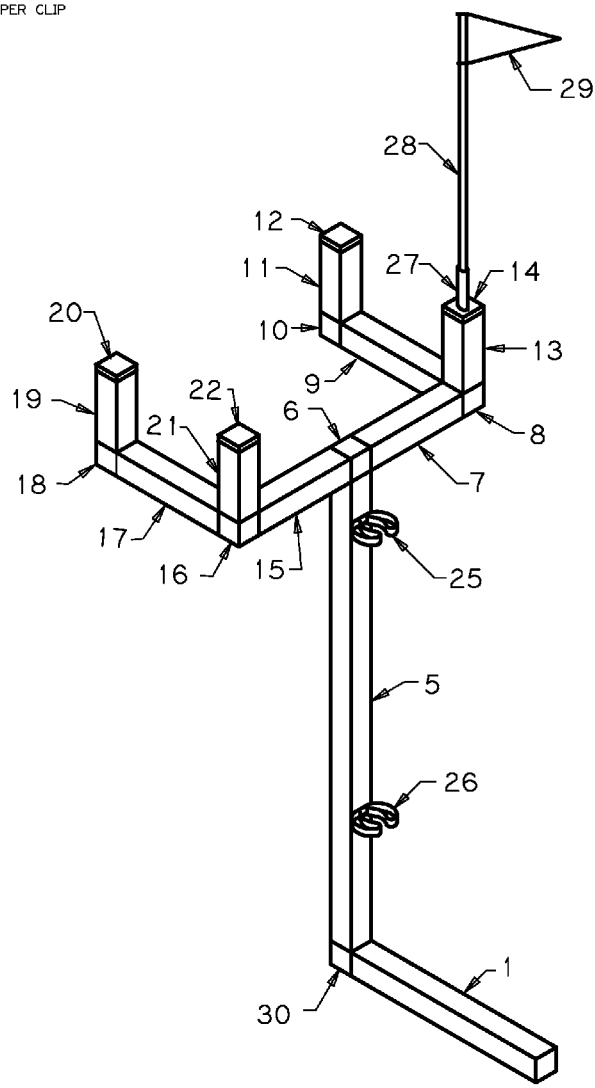

SECOND EMBODIMENT

ISOMETRIC VIEW
FIG. 9

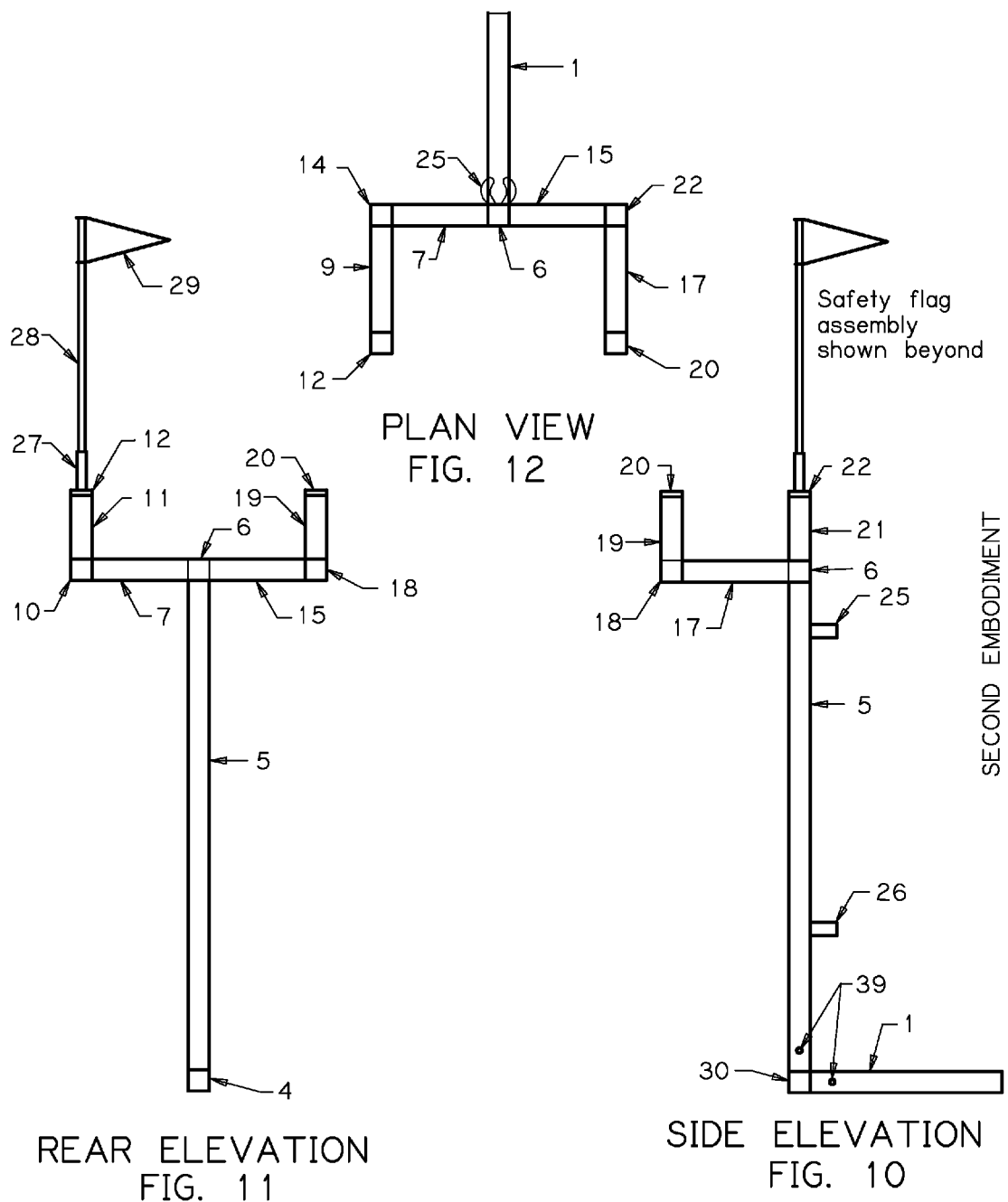

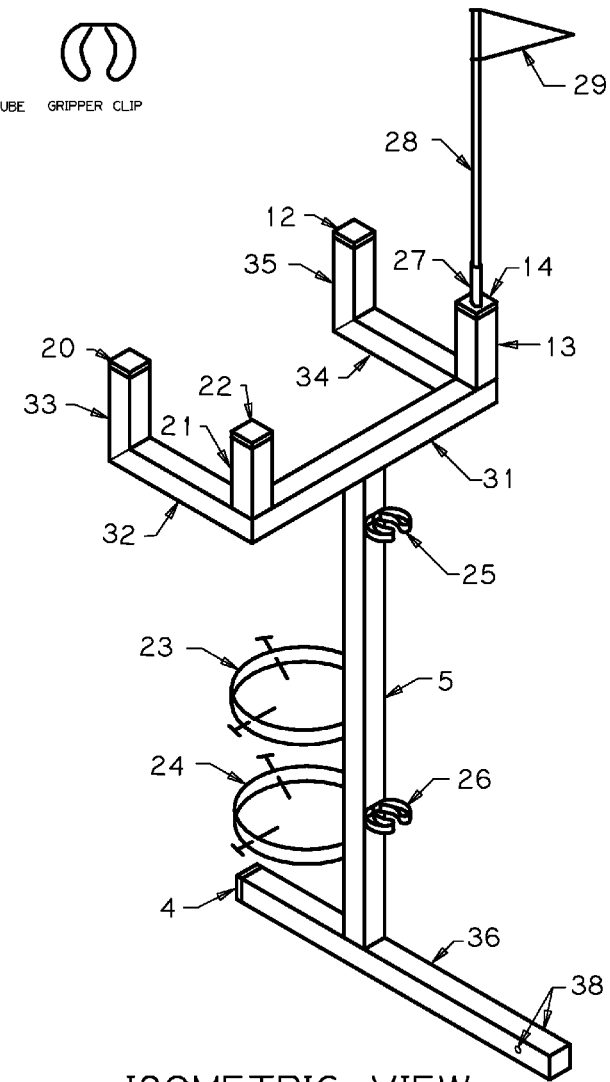

FIG. 13
ISOMETRIC VIEW
WITH OXYGEN TANK HOLDER ASSEMBLY

WELDED ARTICLE CARRIER FRAME
WITH OXYGEN TANK HOLDER ASSEMBLY

PARTS LIST

| | |
|---|---|
| 4 | STANDARD END CAP |
| 5 | VERTICAL STRENGTH MEMBER |
| 12 | STANDARD END CAP |
| 13 | FRONT POST |
| 14 | THREADED END CAP |
| 20 | STANDARD END CAP |
| 21 | FRONT POST |
| 22 | STANDARD END CAP |
| 23 | CYLINDRICAL BAND W/ THUMBSCREWS |
| 24 | CYLINDRICAL BAND W/ THUMBSCREWS |
| 25 | GRIPPER CLIP |
| 26 | GRIPPER CLIP |
| 27 | THREADED ROD BASE |
| 28 | ROD |
| 29 | SAFETY FLAG |
| 31 | CROSS-MEMBER |
| 32 | HORIZONTAL ARM |
| 33 | REAR POST |
| 34 | HORIZONTAL ARM |
| 35 | REAR POST |
| 36 | MOUNTING/TANK SUPPORT BAR |
| 38 | DRILLED HOLE |

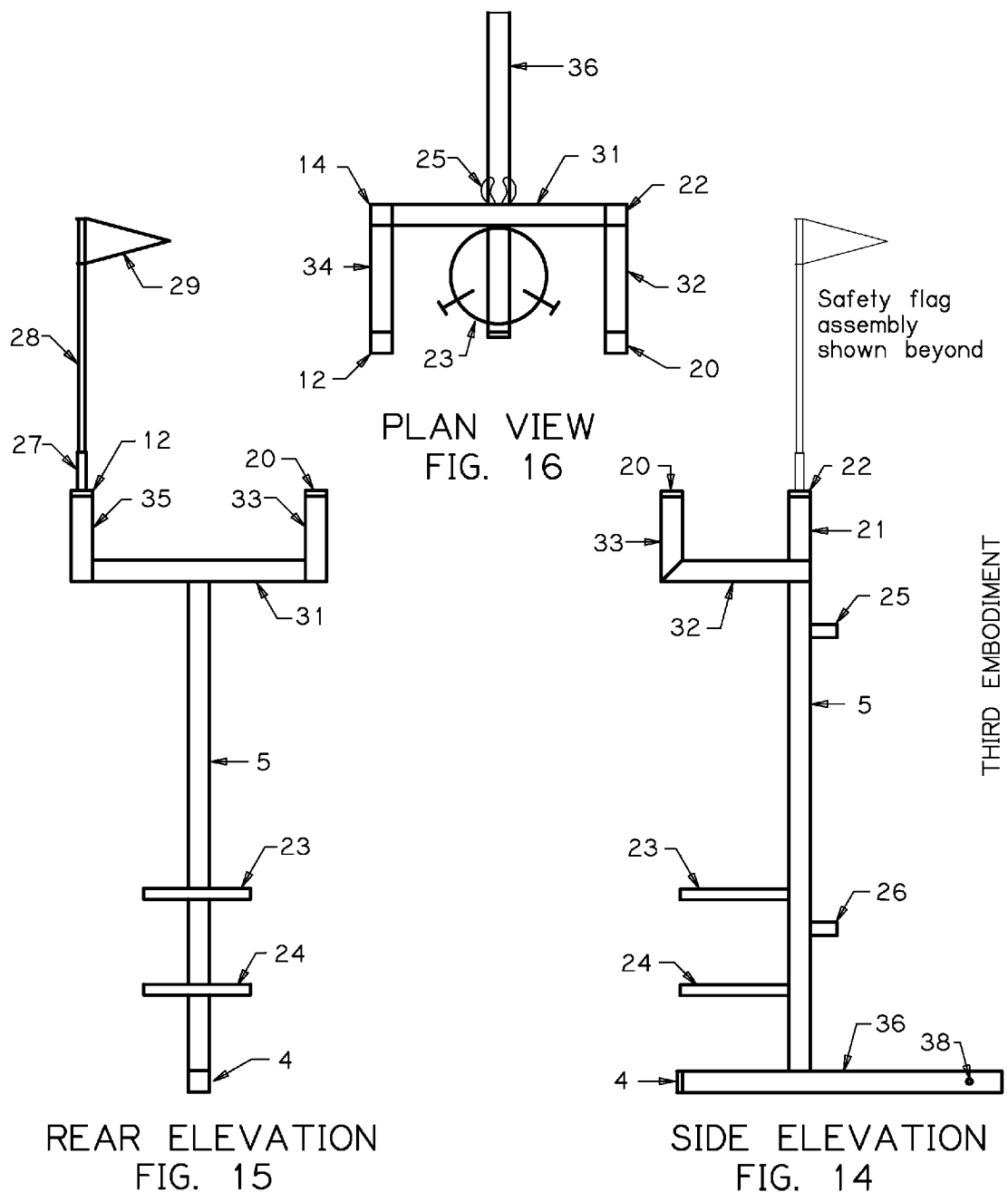

WELDED ARTICLE CARRIER FRAME

STANDARD END CAP

THREADED END CAP

CYLINDRICAL BANDS

HOLLOW TUBE OR BAR

GRIPPER CLIP

PARTS LIST

- 12 STANDARD END CAP
- 13 FRONT POST
- 14 THREADED END CAP
- 20 STANDARD END CAP
- 21 FRONT POST
- 22 STANDARD END CAP
- 25 GRIPPER CLIP
- 26 GRIPPER CLIP
- 27 THREADED ROD BASE
- 28 ROD
- 29 SAFETY FLAG
- 31 CROSS-MEMBER
- 32 HORIZONTAL ARM
- 33 REAR POST
- 34 HORIZONTAL ARM
- 35 REAR POST
- 37 ONE PIECE MOUNTING BAR & VERTICAL STRENGTH MEMBER

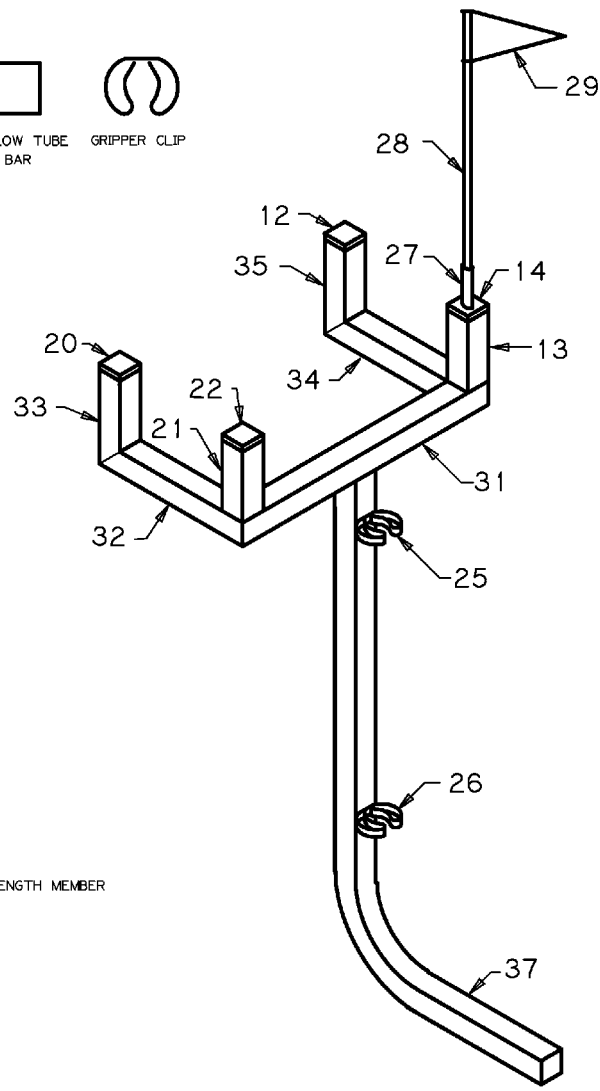

FOURTH EMBODIMENT

ISOMETRIC VIEW
FIG. 17

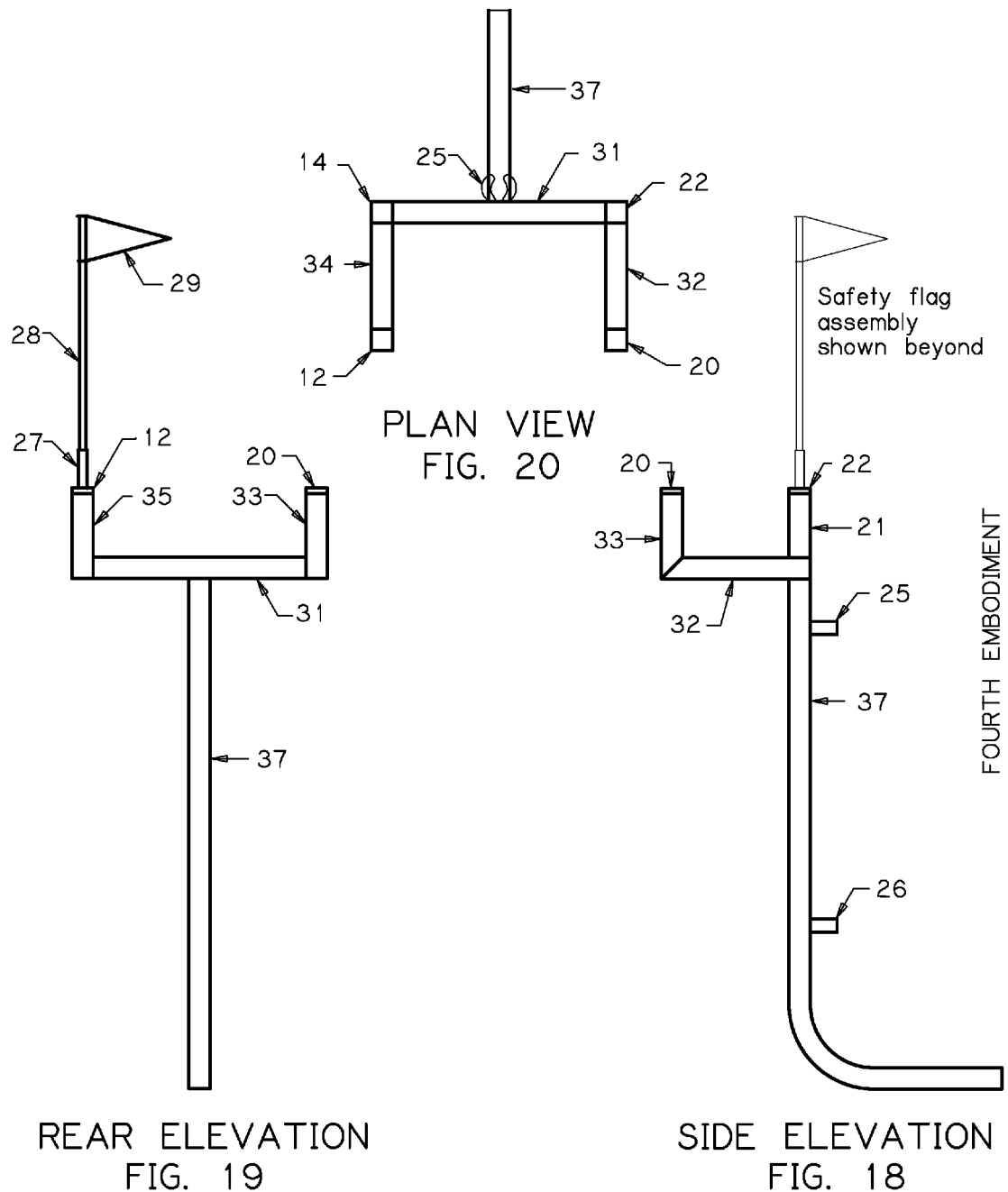

DEVICE FOR CARRYING ARTICLES ON A PERSONAL MOBILITY VEHICLE

FIELD OF THE INVENTION

This invention relates to a multi-purpose article carrier for a personal mobility vehicle, such as a mobility scooter or other powered mobility vehicle, of the type used to transport a disabled person.

BACKGROUND OF THE INVENTION

Personal mobility vehicles, including but not limited to motorized mobility scooters and powered wheelchairs, have become common place for people with slight or severe disablements to move about independently. With the increased use of these vehicles, there is a demand for vehicles that may be modified to assist the user with transporting articles.

Personal mobility vehicles in and of themselves, have minimal means for transporting goods. Although devices for expanding the cargo capacity for personal mobility vehicles have been known in the art for quite some time, they are typically designed only for a single or dual purpose and have to be detached from the vehicle and a different device attached to carry out another purpose. For example, there are holder systems that are designed to hold walking aids such as crutches, canes, and walkers, which are described in U.S. Pat. No. 6,547,112. U.S. Publication No. 2012/0187265 also describes a carrier that is attached to a mobility vehicle, but it is limited to transporting minimal items that can fit into the base support of the carrier. There are other carriers that have been designed to attach to the back of the motorized vehicles in order to tow large quantities of goods, but these carriers are large, bulky, and decrease the maneuverability of the vehicle because they are in contact with the ground and are merely towed behind the vehicle. For example, U.S. Publication No. 2006/0220346 describes a trailer that can be attached to the rear of a motorized vehicle and U.S. Pat. No. 4,902,029 describes a luggage carrier that can be attached to the rear of a wheelchair. U.S. Pat. No. 7,967,174 describes a basket that can be secured to the back of a motorized vehicle to carry large quantities of goods, but this carrier is bulky and may tip the carrier over if there are heavy goods placed in the basket.

Thus, there is a need in the art for providing a multi-purpose article carrier for a personal mobility vehicle or other powered mobility vehicle that is compact and light weight so as to not interfere with the maneuverability of the vehicle. It is an object of this invention to provide an improved removable attachable multi-purpose carrier that is light weight and easy to install.

SUMMARY OF THE INVENTION

It is the purpose of the present invention to provide a multi-purpose article carrier for carrying an assortment of goods, which can be detachably connected to the back of a personal mobility vehicle or other motorized personal mobility device. Because the frame is suspended from the towed vehicle and does not come into contact with the road, it is no more difficult to drive a vehicle with this attachment than an ordinary personal mobility vehicle. Further, this device is light weight, easy to install, remove, and store.

The present invention can be used to carry various combinations of goods, including but not limited to, a cane, an oxygen tank, a walker, shopping bags, tote bags, lawn chairs, hangers while clothes shopping, small hand grocery baskets, or a custom storage bag that can be detachably connected to the article carrier. The present invention also includes the attachment of a safety flag, or the like, to the frame. It being understood that not all combinations of goods can be accommodated at the same time, e.g., an oxygen tank and a walker cannot be transported at the same time. The weight of the article carrier and its contents, combined with the weight of the rider, should not exceed the recommended weight capacity of the personal mobility vehicle.

The device anticipates the utilization of a female receiver that typically comes mounted under the seat of personal mobility vehicles. The receiver may also be mounted in other locations on the rear of the personal mobility vehicle in other embodiments. A mounting bar is provided at the bottom of the vertical strength member of this article carrier that just fits within the female receiver and is secured in place.

BRIEF DESCRIPTION OF THE DRAWINGS

FIG. 2 illustrates the rear elevation view of the invention mounted to a personal mobility vehicle.

FIG. 3 illustrates the side elevation view of the invention mounted to a personal mobility vehicle.

FIG. 4 illustrates the top plan views of several embodiments of the invention. FIG. 4(a) shows the top plan view of the embodiments without an oxygen tank holder and FIG. 4(b) shows the top plan view of the embodiments that include an oxygen tank holder.

FIG. 5 is an isometric view of the first embodiment of the invention showing the frame joined together utilizing friction connectors and assembled with an oxygen tank holder assembly.

FIG. 6 is a side elevation view of the first embodiment of the invention illustrating the frame joined together utilizing friction connectors and assembled with an oxygen tank holder assembly.

FIG. 7 is a rear elevation view of the first embodiment of the invention illustrating the frame joined together utilizing friction connectors and assembled with an oxygen tank holder assembly.

FIG. 8 is a plan view of the first embodiment of the invention illustrating the frame joined together utilizing friction connectors and assembled with an oxygen tank holder assembly.

FIG. 9 is an isometric view of the second embodiment of the invention illustrating the frame joined together utilizing friction connectors and assembled without an oxygen tank holder assembly.

FIG. 10 is a side elevation view of the second embodiment of the invention illustrating the frame joined together utilizing friction connectors and assembled without an oxygen tank holder assembly.

FIG. 11 is a rear elevation view of the second embodiment of the invention illustrating the frame joined together utilizing friction connectors and assembled without an oxygen tank holder assembly.

FIG. 12 is a plan view of the second embodiment of the invention illustrating the frame joined together utilizing friction connectors and assembled without an oxygen tank holder assembly.

FIG. 13 is an isometric view of the third embodiment of the invention illustrating a welded frame assembled with an oxygen tank holder assembly.

FIG. 14 is a side elevation view of the third embodiment of the invention illustrating a welded frame assembled with an oxygen tank holder assembly.

FIG. 15 is a rear elevation view of the third embodiment of the invention illustrating a welded frame assembled with an oxygen tank holder assembly.

FIG. 16 is a plan view of the third embodiment of the invention illustrating a welded frame assembled with an oxygen tank holder assembly.

FIG. 17 is an isometric view of the fourth embodiment of the invention illustrating a welded frame assembled without an oxygen tank holder assembly.

FIG. 18 is a side elevation view of the fourth embodiment of the invention illustrating a welded frame assembled without an oxygen tank holder assembly.

FIG. 19 is a rear elevation view of the fourth embodiment of the invention illustrating a welded frame assembled without an oxygen tank holder assembly.

FIG. 20 is a plan view of the fourth embodiment of the invention illustrating a welded frame assembled without an oxygen tank holder assembly.

DETAILED DESCRIPTION OF PREFERRED EMBODIMENTS

Figure 1:
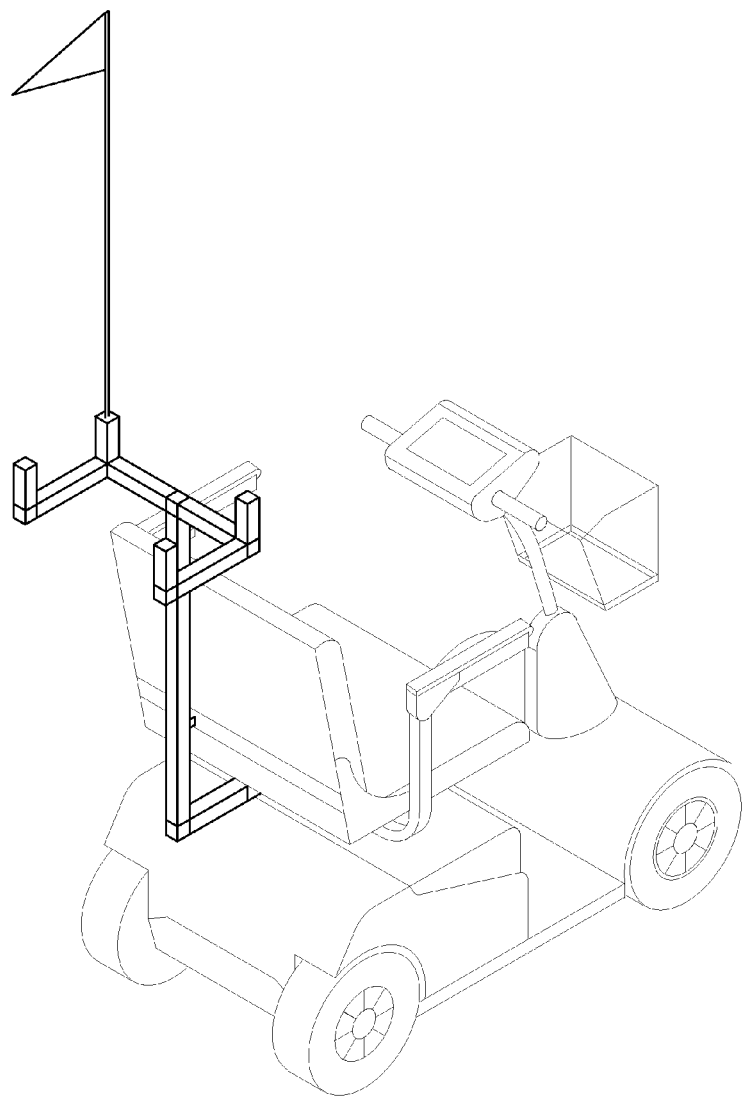
FIG. 1 illustrates the isometric view of the invention mounted to a personal mobility vehicle.

For the purpose of illustrating the invention, there are four embodiments of the invention that are described. It should be understood that this invention is not limited to the precise arrangements and instrumentalities shown. Other objects, features and advantages of the present invention will become more fully apparent from the following detailed description of the preferred embodiments, the appended claims and the accompanying drawings herein.

One of the preferred embodiments of the device includes a frame, which is constructed of square hollow tube aluminum, or any other strong light weight material. However, the frame may be of any given shape and either hollow or solid depending on the need or the desire. The connectors are made of nylon, nylon composite, or other material having similar characteristics. Appropriate adhesive shall be used to insure a secure connection of the connectors to the tubing. Fasteners (39) such as thru-bolt with washers and lock nuts, screw post bolts or rivets or other fastening means known in the art, shall be used at locations indicated on FIGS. 6 and 10. The color and finish of the present invention can vary depending on the need and desire. The preferred overall dimensions of the frame is about thirteen inches wide by about twenty-eight inches high, by about sixteen inches deep.

The first embodiment of the present invention is illustrated by way of example in FIG. 5 through FIG. 8. In this embodiment the frame members are joined together by friction connectors and assembled with the oxygen tank holder assembly.

The base of the vertical strength member (5) is secured to the mounting bar (1) utilizing a three-way flat tee connector (2) and the tank support bar (3) is secured to the remaining horizontal leg of the three-way flat tee connector (2), extending towards the rear of the frame. A standard end cap (4) is inserted into the open end of the tank support bar (3). Across the top of the vertical strength member (5) the cross members (7, 15) are secured in opposite positions, perpendicular to either side of the vertical strength member (5), utilizing a three-way flat tee connector (6) so that the cross members (7, 15) are also in a perpendicular alignment to the mounting bar (1). Two horizontal arms (9, 17) are secured at right angles to the ends of the cross members (7, 15), mirroring about the vertical strength member (5) by using three-way corner connectors (8, 16). The horizontal arms (9, 17) extend towards the rear of the frame. Front posts (13, 21) are secured to the vertical leg of the three-way corner connectors (8, 16). Rear posts (11, 19) are secured to the rear end of the horizontal arms (9, 17) using two-way right angle connectors (10, 18). Standard end caps (12, 20) are inserted into the tops of the two rear posts (11, 19) and a standard end cap (22) is inserted into the top of the front post (21). Threaded end cap (14) is inserted into the top of the front post (13).

A safety flag (29) is attached to the frame using a rod (28) and a threaded rod base (27), which is attached to a female threaded end cap (14), which is attached to a front post (13). The rod (28) is secured to the threaded rod base (27) using adhesive. The safety flag (29) can be a flag, pennant, or something of the sort and is secured to the top of the rod (28) using hog rings or any other convenient means known in the art. The safety flag assembly can easily be removed by unscrewing the rod base (27) from the female threaded end cap (14).

Two gripper clips (25, 26) are attached by screws, rivets, or any other convenient means known in the art to the back of the vertical strength member (5) in order to transport a cane. Two cylindrical bands (23, 24) are attached by screws, rivets, bolts, or any other convenient means known in the art to the rear of the vertical strength member (5) for means for use in transporting an oxygen tank. Two thumb screws are attached to each of the cylindrical bands (23, 24) to tighten against and stabilize the oxygen tank.

This first embodiment of the frame is attached to the mobility vehicle by inserting a threaded bolt with knob, set screw, or other fastening means known in the art, using the threaded hold weldment, as typically found as part of the female receiver located on the personal mobility vehicle. After the mounting bar (1) has been inserted into the female receiver, it is secured by tightening the threaded bolt, through the two drilled holes (38) provided in the mounting bar portion of the frame, and against the opposite inside wall of the female receiver. A female receiver is well known in the art and is not disclosed or discussed further herein. When it is desired to remove the frame away from the personal mobility vehicle, the set screw or threaded bolt with knob is loosened and the frame is removed. The mounting bar portion of the frame may also be retained within the female receiver by any other means known in the art for securing a mounting bar.

The second embodiment of the present invention is illustrated in FIG. 9 through FIG. 12. In this embodiment the frame members are joined together by friction connectors and assembled without the oxygen tank holder assembly.

The base of the vertical strength member (5) is secured to the mounting bar (1) using a two-way right angle connector (30). Across the top of the vertical strength member (5) there are two cross members (7, 15) that are secured in opposite positions, perpendicular to either side of the vertical strength member (5) using a three way flat tee connector (6) so that the cross members (7, 15) are also in a perpendicular alignment to the mounting bar (1). Two horizontal arms (9, 17) are secured at right angles to the ends of the cross members (7, 15) mirroring about the vertical strength member (5) using the three-way corner connectors (8, 16). The horizontal arms (9, 17) extend towards the rear of the frame. Two front posts (13, 21) are secured to the vertical leg of the three-way corner connectors (8, 16). Two rear posts (11, 19) are secured to the rear end of the horizontal arms (9, 17) using two-way right angle connectors (10, 18). Standard end caps (12, 20) are inserted into the tops of the two rear posts (11, 19) and a standard end cap (22) is inserted into the top of the front post (21). A threaded end cap (14) is inserted into the top of the front post (13).

A safety flag (29) is attached to the frame using a rod (28) and a threaded rod base (27), which is attached to a female threaded end cap (14), which is attached to a front post (13).

The rod (28) is secured to the threaded rod base (27) using adhesive. The safety flag (29) can be a flag, pennant, or something of the sort and is secured to the top of the rod (28) using hog rings or any other convenient means known in the art. The safety flag assembly can easily be removed by unscrewing the rod base (27) from the female threaded end cap (14).

Two gripper clips (25, 26) are attached by screws, rivets, or any other convenient means known in the art to the back of the vertical strength member (5) in order to transport a cane.

This second embodiment of the frame is attached to the mobility vehicle by inserting a threaded bolt with knob, set screw, or other fastening means known in the art, using the threaded hold weldment, as typically found as part of the female receiver located on the personal mobility vehicle, and securing it by tightening it against the mounting bar (1) of the frame that has been inserted into the female receiver. A female receiver is well known in the art and is not disclosed or discussed further herein. When it is desired to remove the frame away from the personal mobility vehicle, the set screw or threaded bolt with knob is loosened and the frame is removed. The mounting bar portion of the frame may also be retained within the female receiver by any other means known in the art for securing a mounting bar.

The third embodiment of the present invention is illustrated in FIG. 13 through FIG. 16. In this embodiment the frame members are welded together and assembled with the oxygen tank holder assembly.

The base of the vertical strength member (5) is welded at a set distance from the end of the mounting/tank support bar (36). A standard end cap (4) is inserted into the open end at the rear of the mounting/tank support bar (36). The cross member (31) is centered across the top of the vertical strength member (5) and welded so that the cross member (31) is in a perpendicular alignment to the mounting/tank support bar (36). Two horizontal arms (32, 34) are welded at right angles to each end of the cross member (31) mirroring about the vertical strength member (5) extending towards the rear of the frame. Two front posts (13, 21) are welded to the top of the corners where the cross-member (31) and horizontal arms (32, 34) intersect. Two rear posts (33, 35) are joined and welded to the rear ends of the horizontal arms (32, 34). Standard end caps (12, 20) are inserted into the tops of the two rear posts (33, 35) and a standard end cap (22) is inserted into the top of the front post (21). A threaded end cap (14) is inserted into the top of the front post (13).

A safety flag (29) is attached to the frame using a rod (28) and a threaded rod base (27), which is attached to a female threaded end cap (14), which is attached to a front post (13). The rod (28) is secured to the threaded rod base (27) using adhesive. The safety flag (29) can be a flag, pennant, or something of the sort and is secured to the top of the rod (28) using hog rings or any other convenient means known in the art. The safety flag assembly can easily be removed by unscrewing the rod base (27) from the female threaded end cap (14).

Two gripper clips (25, 26) are attached by screws, rivets, or any other convenient means known in the art to the back of the vertical strength member (5) in order to transport a cane. Two cylindrical bands (23, 24) are attached by screws, rivets, bolts, or any other convenient means known in the art to the rear of the vertical strength member (5) for means for use in transporting an oxygen tank. Two thumb screws are attached to each of the cylindrical bands (23, 24) to tighten against and stabilize the oxygen tank.

This third embodiment of the frame is attached to the mobility vehicle by inserting a threaded bolt with knob, set screw, or other fastening means known in the art, using the threaded hold weldment, as typically provided as part of the female receiver located on the personal mobility vehicle. After the mounting/tank support bar (36) has been inserted into the female receiver, it is secured by tightening the threaded bolt through the two drilled holes (38), provided in the mounting/tank support bar portion of the frame, and against the opposite inside wall of the female receiver. A female receiver is well known in the art and is not disclosed or discussed further herein. When it is desired to remove the frame away from the personal mobility vehicle, the set screw or threaded bolt with knob is loosened and the frame is removed. The mounting/tank support bar portion of the frame may also be retained within the female receiver by any other means known in the art for securing a mounting bar.

The fourth embodiment of the present invention is illustrated in FIG. 17 through FIG. 20. In this embodiment the frame members are welded together and assembled without the oxygen tank holder assembly.

In this embodiment the vertical strength member and the mounting bar is a single bent piece known as the one piece mounting bar and vertical strength member (37). This piece has approximately a 90 degree bend. The cross member (31) is centered across the top of the vertical portion of the one piece mounting bar and vertical strength member (37) and welded so that the cross member (31) is in a perpendicular alignment to the mounting bar portion of the one piece mounting bar and vertical strength member (37). Two horizontal arms (32, 34) are welded at right angles to each end of the cross member (31) mirroring about the vertical portion of the one piece mounting bar and vertical strength member (37) extending towards the rear of the frame. Two front posts (13, 21) are welded to the top of the corners where the cross member (31) and the horizontal arms (32, 34) intersect. Two rear posts (33, 35) are welded to the rear ends of the horizontal arms (32, 34). Standard end caps (12, 20) are inserted into the tops of the two rear posts (33, 35) and a standard end cap (22) is inserted into the top of the front post (21). A threaded end cap (14) is inserted into the top of the front post (13).

A safety flag (29) is attached to the frame using a rod (28) and a threaded rod base (27), which is attached to a female threaded end cap (14), which is attached to a front post (13). The rod (28) is secured to the threaded rod base (27) using adhesive. The safety flag (29) can be a flag, pennant, or something of the sort and is secured to the top of the rod (28) using hog rings or any other convenient means known in the art. The safety flag assembly can easily be removed by unscrewing the rod base (27) from the female threaded end cap (14).

This fourth embodiment of the frame is attached to the mobility vehicle by inserting a threaded bolt with knob, set screw, or other fastening means known in the art, using the threaded hold weldment, as typically provided as part of the female receiver located on the personal mobility vehicle, and securing it by tightening it against the portion of the one piece mounting bar and vertical strength member (37) of the frame that has been inserted into the female receiver. A female receiver is well known in the art and is not disclosed or discussed further herein. When it is desired to remove the frame away from the personal mobility vehicle, the set screw or threaded bolt with knob is loosened and the frame is removed. The portion of the one piece mounting bar and vertical strength member of the frame may also be retained within the female receiver by any other means known in the art for securing a mounting bar.

What is claimed is:

1. A device for carrying multiple articles on a mobility scooter or powerchair, the device comprising:
   a frame that is configured for attachment to the mobility scooter or powerchair by securing a front end of a mounting bar of the frame within female receiver port located on the mobility scooter or powerchair, said frame comprising:
   the mounting bar, arranged in a horizontal position when inserted into the female receiver port;
   a vertical strength member having a base fixedly attached to a rear end of the mounting bar, and extending perpendicularly upward from the mounting bar;
   two cross members extending horizontally from a top of the vertical strength member and in opposite positions, perpendicular to either side of the vertical strength member and joined to the top of the vertical strength member, the two cross members also being perpendicular to the mounting bar, albeit on a higher vertical plane;
   two horizontal arms positioned horizontal and perpendicular to the two cross members, such that each cross member has one horizontal arm connected thereto, the two horizontal arms being on opposite sides of the vertical strength member and extending toward a rear of the frame;
   two front posts, each front post joined to one of the two cross members and one of the two horizontal arms, respectively, such that each front post extends vertically upward from each intersection of the cross members and horizontal arms;
   two rear posts, each rear post joined to one of the two horizontal arms such that each rear post extends vertically upward from a rear end of the horizontal arms;
   connectors to connect (i) the mounting bar and vertical strength member, (ii) the at least two cross members to the vertical strength member, (iii) the cross members, the horizontal arms and the front posts, and (iv) the horizontal arms and the rear posts; and
   an oxygen tank holder assembly comprising:
      a tank support bar extending from or integrally connected with the mounting bar.

2. The device of claim 1, wherein the connectors comprise (i) three-way flat tee connectors, (ii) three-way corner connectors, and (iii) two-way right angle connectors, for joining the frame together.

3. The device of claim 1, wherein the oxygen tank holder assembly further comprises:
   at least two cylindrical bands, which are attached by a fastening means to the vertical strength member, and
   at least two thumb screws attached to each cylindrical band to tighten against and stabilize the oxygen tank.

4. The device of claim 1, wherein the frame includes at least two gripper clips that are attached to the front of the vertical strength member in order to transport a cane, umbrella, or similarly shaped item.

5. The device of claim 1, wherein the frame includes a safety flag assembly that is attached to one of the front posts, the safety flag assembly comprising:
   a rod positioned vertically and having a base for connecting the rod to one of the front posts;
   a safety flag connected to the rod.

6. A device for carrying multiple articles on a mobility scooter or powerchair, the device comprising:
   a welded frame that is configured for attachment to the mobility scooter or powerchair by securing a front end of a mounting bar of the frame within a female receiver port located on the mobility scooter or powerchair, said frame comprising:
   the mounting bar, arranged in a horizontal position when inserted into the female receiver port;
   a vertical strength member having a base welded directly to the mounting bar and extending perpendicularly upward from the mounting bar;
   a cross member extending from and welded to the vertical strength member such that the cross member is perpendicular to the mounting bar, albeit on a higher horizontal plane;
   two horizontal arms extending from and welded to each of the at least two cross members, the horizontal arms being on opposite sides of the cross member and positioned perpendicular to the cross member, the two horizontal arms being on opposite sides of the vertical strength member and extending toward a rear of the frame; and
   two front posts welded to the cross member and extending vertically upward from corners where the cross member and horizontal arms intersect;
   two rear posts welded to the horizontal arms and extending vertically upward from a rear end of the horizontal arms;
   an oxygen tank holder assembly comprising:
      a tank support bar that is integrally formed with the mounting bar.

7. The device of claim 6, wherein the oxygen tank holder assembly further comprises:
   at least two cylindrical bands, which are attached by a fastening means to the vertical strength member; and
   at least two thumb screws attached to each cylindrical band to tighten against and stabilize the oxygen tank.

8. The device of claim 6, wherein the frame includes at least two gripper clips that are attached to the front of the vertical strength member in order to transport a cane, umbrella, or similarly shaped item.

9. The device of claim 6, wherein the frame includes a safety flag assembly that is attached to one of the front posts, the safety flag assembly comprising:
   a rod positioned vertically and having a base for connecting the rod to one of the front posts;
   a safety flag connected to the rod.

10. A device for carrying multiple articles on a mobility scooter or powerchair, the device comprising:
   a welded frame that is configured for attachment to the mobility scooter or powerchair by securing a front end of a mounting bar of the frame within a female receiver port located on the mobility scooter or powerchair, said frame comprising:
   the mounting bar that is one piece with a vertical strength member and that is bent in approximately a ninety degree angle;
   a cross member extending from and welded to the vertical strength member such that the cross member is in perpendicular alignment to the mounting bar, albeit on a plane;
   two horizontal arms extending from and welded directly to the cross member, one at each opposite end of the cross member, and each horizontal arm positioned perpendicular to the cross member, the two horizontal arms being on opposite sides of the vertical strength member and extending toward a rear of the frame;
   two front posts welded to the cross member such that each front post extends vertically upward from each intersection of the cross members and horizontal arms; and two rear posts welded to the horizontal arms such that each rear post extends vertically upward from a rear end of the horizontal arms.

11. The device of claim 10, wherein the frame includes at least two gripper clips that are attached to the front of the vertical strength member in order to transport a cane, umbrella, or similarly shaped item.

12. The device of claim 10, wherein the frame includes a safety flag assembly that is attached to one of the front posts, the safety flag assembly comprising:
   a rod positioned vertically and having a base for connecting the rod to one of the front posts;
   a safety flag connected to the rod.

13. A device for carrying multiple articles on a mobility scooter or powerchair, said device comprising:
   a frame that is configured for attachment to the mobility scooter or powerchair by securing a front end of a mounting bar of the frame within a female receiver port of the mobility scooter or powerchair, said frame comprising:
   a mounting bar arranged in a horizontal position when inserted in the female receiver port;
   vertical strength member having a base fixedly attached to a rear end of the mounting bar and extending vertically upward from said mounting bar;
   two cross members extending horizontally from a top of the vertical strength member, each cross member being perpendicular to either side of the vertical strength member and joined to the top of the vertical strength member, such that the cross members are horizontal and perpendicular to mounting bar, albeit on a higher plane;
   two horizontal arms positioned horizontal and perpendicular to the cross members, such that each cross member has one horizontal arm connected thereto, each horizontal arm joined to a far end of the respective cross member, the two horizontal arms being on opposite sides of the vertical strength member and extending toward a rear of the frame;
   two front posts, each front post joined to one of the two cross members and one of the two horizontal arms, respectively, such that each front post extends vertically upward from each intersection of the cross members and horizontal arms;
   two rear posts, each rear post joined to one of the two horizontal arms such that each rear post extends vertically upward from a rear end of the horizontal arms;
   three two-way right angle connectors that join (i) the mounting bar to the vertical strength member, and (ii) the horizontal arms to the rear posts;
   one three-way flat tee connector that joins the two cross members to the vertical strength member;
   two three-way corner connectors that join each of the two cross members to one of the two horizontal arms and one of the two front posts;
   at least three standard end caps inserted and secured as plugs in open ends of, and atop, both rear posts and one of the two front posts;
   at least one female threaded end cap inserted and secured in an open end of, and atop, one of the two front posts;
   at least two gripper clips, attached by a fastening means to the front of the vertical strength member in order to transport a cane, umbrella, or similarly shaped item,
   wherein the frame includes a least one safety flag assembly that is attached atop to a front post, said safety flag assembly comprising:
   a rod positioned vertically;
   a threaded rod base joined to a base of the rod; and
   a safety flag secured atop the rod;
   said flag assembly being mounted onto the frame utilizing the female threaded end cap located on said frame.

* * * * *